Aug. 23, 1960     D. T. AYERS, JR     2,949,892
FLUID PRESSURE MOTOR MECHANISM
Filed April 30, 1959     3 Sheets-Sheet 1
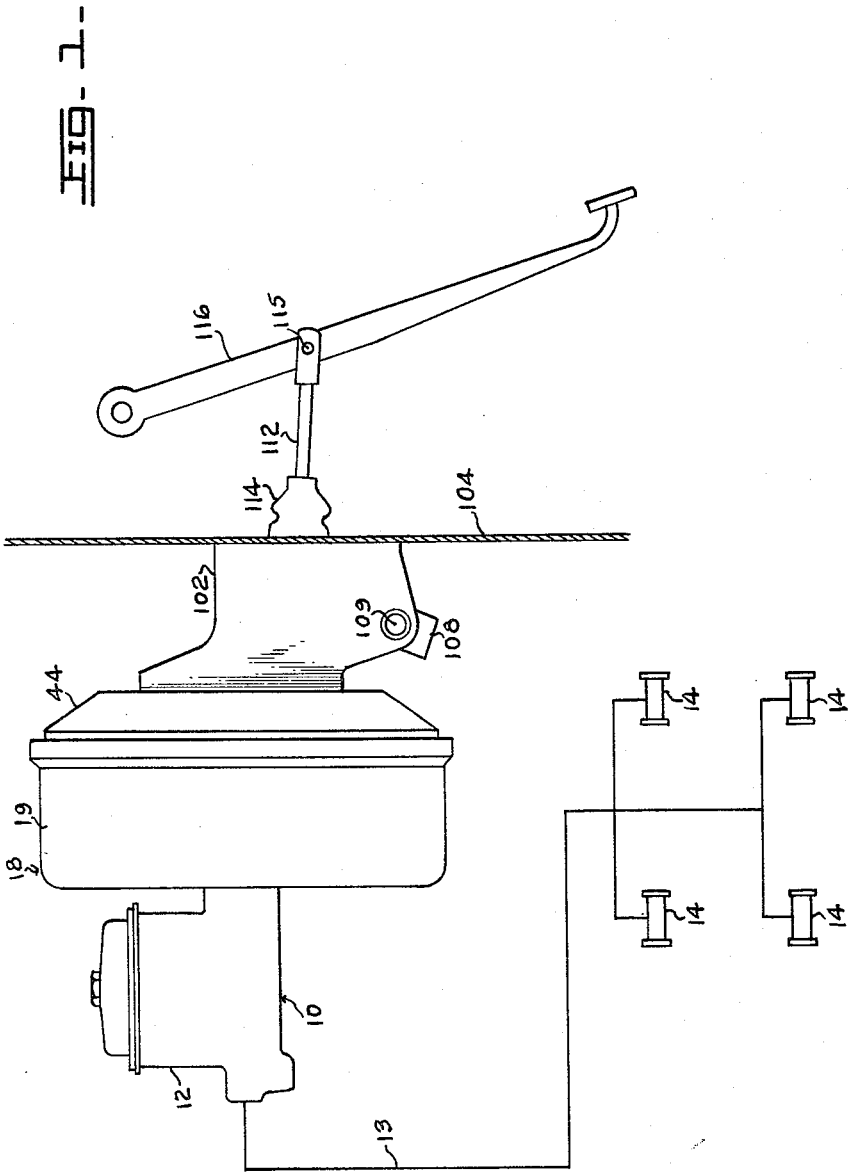
INVENTOR
DAVID T. AYERS JR.
BY John V. Phillips
ATTORNEY

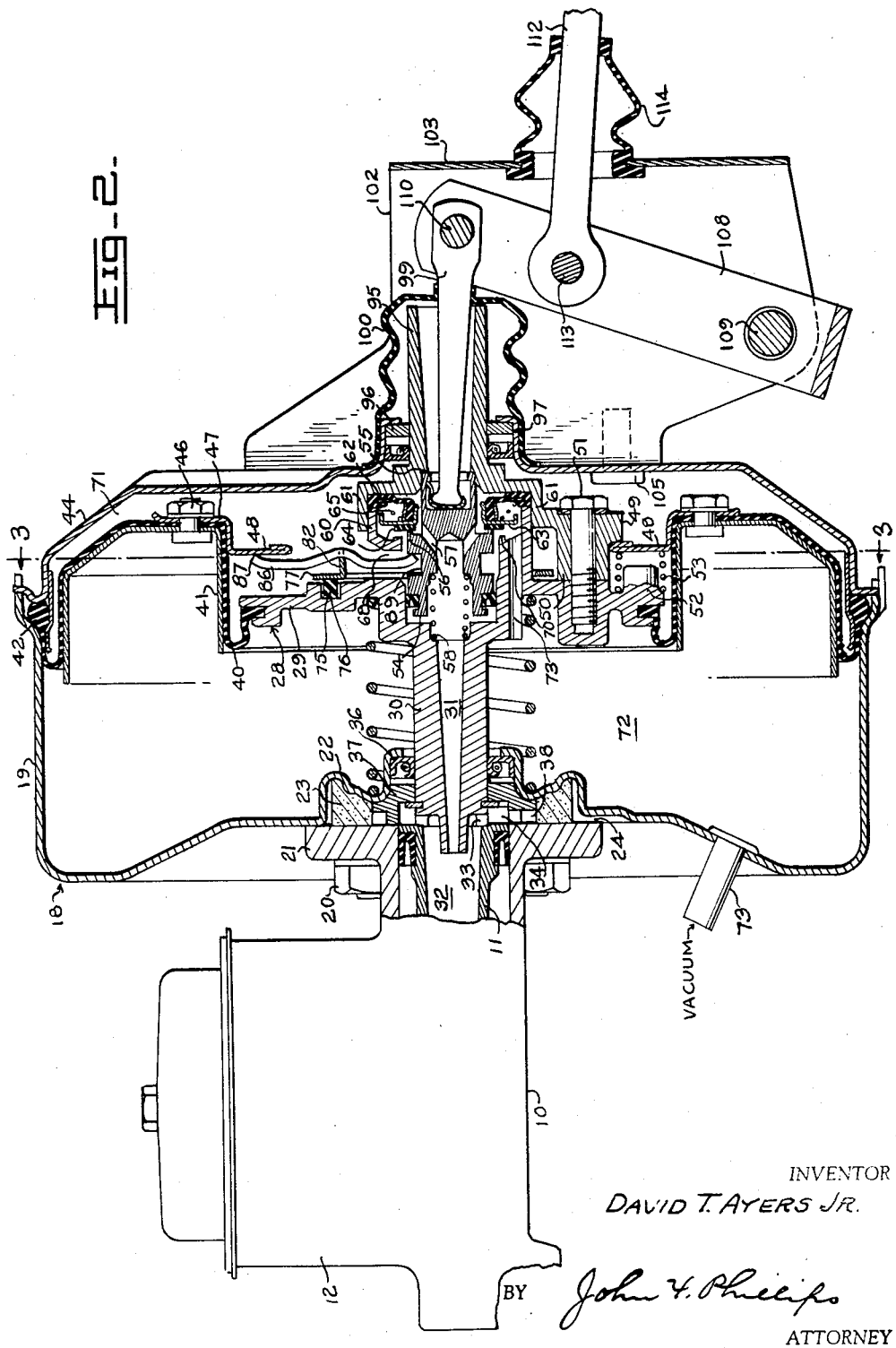

Aug. 23, 1960 D. T. AYERS, JR 2,949,892
FLUID PRESSURE MOTOR MECHANISM
Filed April 30, 1959 3 Sheets-Sheet 3
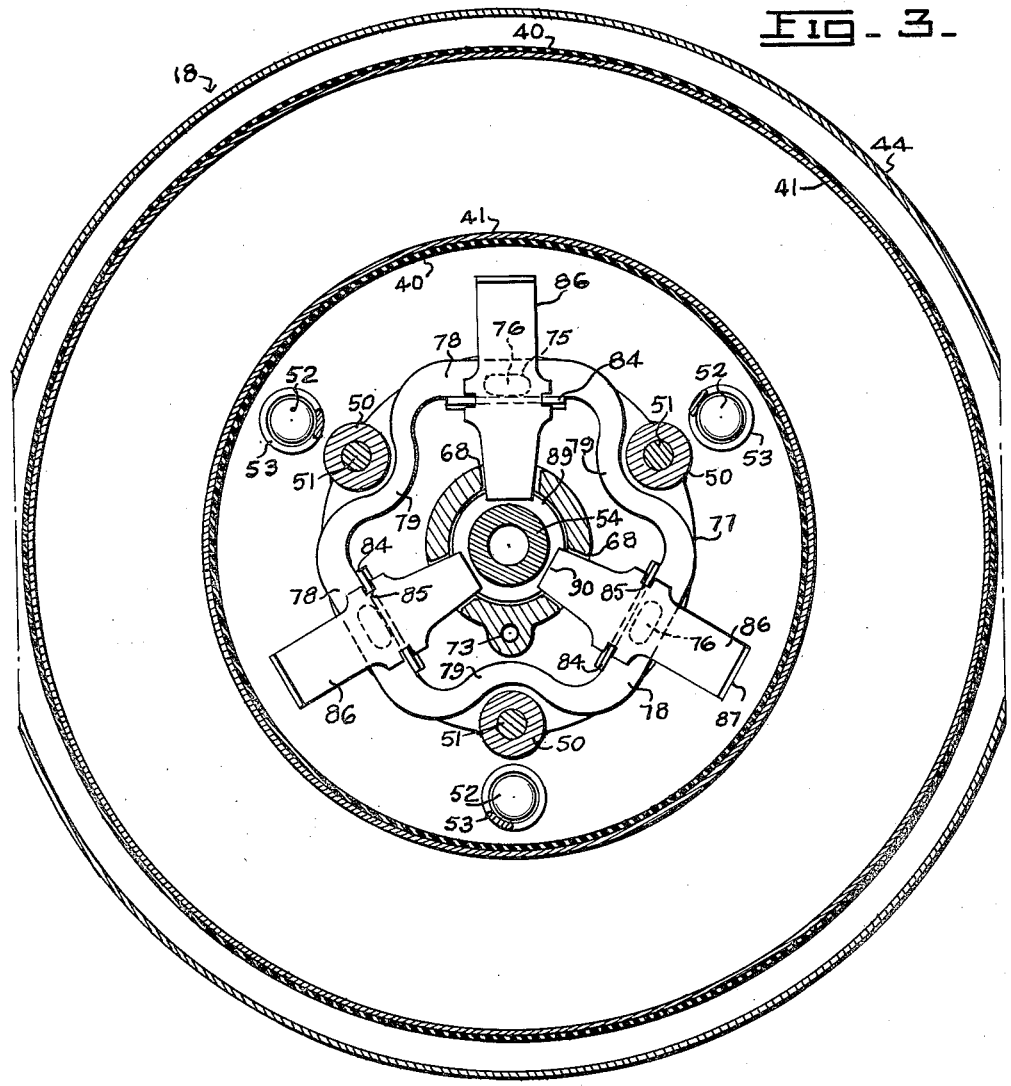
Fig-3-
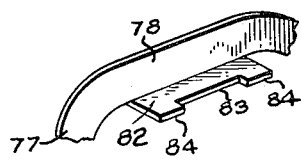
Fig-4-
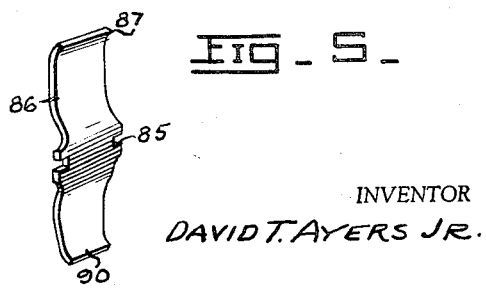
Fig-5-
INVENTOR
DAVID T. AYERS JR.
BY John V. Phillips
ATTORNEY United States Patent Office 2,949,892
Patented Aug. 23, 1960

2,949,892

FLUID PRESSURE MOTOR MECHANISM

David T. Ayers, Jr., Birmingham, Mich., assignor to Kelsey-Hayes Company, Detroit, Mich., a corporation of Delaware Filed Apr. 30, 1959, Ser. No. 810,107

14 Claims. (Cl. 121—41)

This invention relates to a fluid pressure motor mechanism, and more particularly to such a mechanism especially adapted for use in a booster brake system of a motor vehicle.

A number of booster brake motors have been developed which employ pressure responsive units having relatively movable portions and wherein such relative movement is utilized for reacting against the brake pedal in accordance with the degree of energization of the motor or the pressure developed in the master cylinder. Such mechanisms frequently employ reaction levers for transmitting such reaction forces to the brake pedal.

An important object of the present invention is to provide a fluid pressure motor structure of the character referred to wherein an improved reaction lever mounting is provided.

A further object is to provide such a motor mechanism wherein a device generally in the nature of a ring supports a plurality of circumferentially spaced radial reaction levers, and to provide novel means for cushioning such ring relative to the pressure responsive unit of the motor whereby initial pedal movement takes place relatively easily, thus providing a "soft" initial brake operation.

A further object is to provide a substantially simplified mechanism of the character referred to, not only with respect to the mounting of the reaction levers and their engagement with various parts of the mechanism, but also with respect to the structure of the pressure responsive unit of the motor.

A further object is to provide a novel mounting of counter-reaction spring means for preventing the reaction levers from transmitting opposing forces to the brake pedal until a predetermined pressure has been built up in the master cylinder.

Other objects and advantages of the invention will become apparent during the course of the following description.

In the drawings I have shown one embodiment of the invention. In this showing:

Figure 1 is a diagrammatic representation of a vehicle brake system showing the booster motor in elevation;

Figure 2 is an enlarged axial sectional view through the booster motor and associated parts, some of the parts being shown in elevation;

Figure 3 is a section taken substantially on line 3—3 of Figure 2;

Figure 4 is a fragmentary perspective view of a portion of the reaction lever supporting member; and Figure 5 is a detail perspective view of one of the reaction levers.

Referring to Figure 1, the numeral 10 designates the usual master cylinder in which is mounted a pressure generating plunger 11 (Figure 2). The master cylinder is provided with a conventional reservoir 12 and is connected by lines 13 to the vehicle wheel cylinders 14.

A motor indicated as a whole by the numeral 18 is supported with respect to the master cylinder 10, as will become apparent below. The motor 18 comprises a main preferably pressed casing 19 secured as at 20 to a flange 21 formed integral with the master cylinder 10. Adjacent the flange 21, the forward wall of the casing is extended forwardly and shaped as at 22 to form a pocket to receive an air cleaner 23. Air is supplied to this cleaner through a passage 24 formed by pressing one or more grooves in the forward wall of the housing 19.

The motor is provided with a pressure responsive unit indicated as a whole by the numeral 28 and comprising a preferably die-cast body 29 shaped in cross section as shown in Figure 2. This body has a preferably integral, forwardly extending axial portion 30 provided therein with an air passage 31 communicating with the interior 32 of the master cylinder plunger 11. The forward end of the axial extension 30 is provided with radial notches forming air passages 33 communicating with similar passages 34 formed in the rear end of the plunger 11. The central portion of the forward wall of the housing 19 is provided with a seal 36 forwardly of which is arranged a bearing 37 notched as at 38 for the passage of air from the air cleaner 23 through notches 34 and 33 and into the passage 31. This air flows to a valve mechanism to be described below.

The pressure responsive unit 28 further comprises a rolling diaphragm 40 having its inner periphery connected to the cast body 29 and extending along and around an annular shell member 41. The outer periphery of the diaphragm 40 is beaded as at 42 to be clamped between the casing section 19 and a rear casing section 44, these casing sections being secured together in any suitable manner forming no part of the present invention. Secured to the shell 41 by a bolt 46 is an annular reaction transmitting member 47 having an internal flange 48 for a purpose to be described.

The pressure responsive unit further comprises a second cast body 49 having circumferentially spaced bosses 50 through which pass screws 51 for securing the body 49 to the body 29. Radially outwardly of each screw 51, the body 29 is provided with a rearwardly extending boss 52, and a spring 53 is arranged around each boss and engages at its rear end with the flange 48. Rearward movement of the flange 48 relative to the body 49 is limited by engagement with an adjacent portion of the body 49, as shown in Figure 2.

A valve body 54 is axially slidable in the body 29 and is limited in its movement to off position by engagement with a shoulder 55 formed in the body 49. The valve body 54 is provided with an annular air valve seat 56. The space within such seat communicates through passages 57 with the interior of the valve body 54, which in turn communicates with the air passage 31. A spring 58 biases the valve body 54 to the off position shown in Figure 2.

The cast body 29 has a rearwardly extending annular flange 60 fitting within an annular flange 61 formed integral with the body 49, and portions of which carry the bosses 50. The flanges 60 and 61 clamp therebetween the outer bead of a diaphragm 62 which carries a plate 63 to which is bonded an annular resilient valve element 64 normally engaging the valve seat 56. A spring 65 biases the valve 64 to the left as viewed in Figure 2.

At circumferentially spaced points, the flange 60 is separated from the body 29 by radial openings 68 for a purpose to be described. The cast body 29 is provided with a vacuum valve seat 70 concentric with and spaced outwardly of the valve seat 56 and normally disengaged from the valve 64. The space within the valve seat 70 communicates through openings 68 with a variable pressure motor chamber 71, while the space radially outwardly of the valve seat 70 communicates with a constant pressure motor chamber 72 through a passage 73 formed in the body 29. The casing section 19 is provided with a nipple 73 for connection of the chamber 72 with a source of vacuum, and accordingly the motor is normally vacuum suspended. At circumferentially spaced points equidistantly spaced from the bolts 50, the body member 29 is provided with sockets 75 in each of which is arranged a resilient cushion 76 which may be circumferentially elongated as shown in Figure 3. Each of the cushions 76 engages or is bonded to a lever-supporting member 77 which is shaped as shown in Figure 4, having suitable straight sides 78 tangentially arranged relative to the axis of the motor and extending over the cushion members 76. Intervening portions 79 of the supporting member 77 are bowed inwardly to clear the bosses 49.

Each of the straight portions 78 is provided with a rearwardly extending flange 82 (Figures 2 and 4) notched as at 83 to provide rearwardly extending spaced lips 84. Each pair of lips 84 is received in notches 85 (Figures 3 and 5) formed in opposite edges of a reaction lever 86. These levers are radially arranged as shown in Figure 3 and each has its radially outer end turned rearwardly as at 87 to engage the flange 48. The radially inner end of each reaction lever 86 projects through one of the openings 63 for engagement with the rear wall of an annular recess 89 formed in the valve body 54, the radially inner end of each lever being preferably turned rearwardly as at 90 to form a contact edge.

The body 49 is provided with a rearwardly extending sleeve portion 95, and a combined sealing and bearing structure 96 is arranged between such extension and a rearward concentric axial extension 97 on the housing 44. A control push rod 99 extends through the sleeve portion 95 and has connection in any suitable manner with the valve body 54. A boot 100 is connected between the rod 99 and the casing portion 97.

A substantially U-shaped supporting bracket 102 has its forward wall 103 fixed to the vehicle fire wall 104 (Figure 1), and the forward ends of the opposite walls of the bracket 102 are secured as at 105 (Figure 2) to the motor casing section 44. Within the bracket 102 is arranged a lever 108 pivoted at its lower end to the walls of the bracket as at 109 and pivotally connected at its upper end as at 110 to the rear end of the push rod 99. A second push rod 112 extends through an opening in the forward bracket wall 103 and is pivotally connected as at 113 to the lever device 108. A boot 114 is connected between the bracket wall 103 and the push rod 112, and the rear end of the push rod 112 is pivoted as at 115 to a depending brake pedal 116 (Figure 1).

Operation

The parts normally occupy the positions shown in Figure 2. The motor is energized to apply the brakes by operating the brake pedal 116, and the push rod 112 swings the lever 108 to move the rod 99 to the left in Figure 2 to actuate the valve body 54. Initial movement of the valve body transmits similar movement to the inner ends of the reaction levers 86 to move the lever supporting member 77 to the left in Figure 2. Because the members 76 project beyond the sockets 75 and are highly resilient, initial movement of the brake pedal takes place with little resistance from the cushions 76 or the valve return spring 58.

Vacuum from the motor chamber 72 normally is communicated to the motor chamber 71 through passage 73, around the valve seat 70 and outwardly through the radial openings 68. This communication is cut off upon initial movement of the brake pedal in the manner described, the valve seat 56 moving to the left and the spring 65 causing the valve 64 to follow such movement until the valve engages the seat 70. The valve parts are now in lap position. Further movement of the valve body 54 moves the seat 56 from engagement with the valve 64, thus opening communication of the motor chamber 71 to the atmosphere through radial openings 68, around the valve seat 56 and ports 57, the latter being in constant communication with the atmosphere, as previously described, through the air cleaner 23. Thus air will enter the motor chamber 71 and the pressure responsive unit 28 will move to the left to actuate the plunger 11 to displace fluid through the brake lines 13 into the wheel cylinders 14.

It will be apparent that the connection of the radially inner and outer portions of the pressure responsive unit through the diaphragm 40 permits such portions to move independently of each other. Such movement is opposed by the springs 53, acting as counter-reaction springs, as will become apparent. After the master cylinder plunger 11 has generated a predetermined pressure in the master cylinder, which occurs approximately at the point of initial engagement of the brake shoes with the drums, movement of the plunger 11 will be opposed and retarded against the pressure then present in the motor chamber 71. There is no such opposition to movement of the radially outer portion of the pressure responsive unit 28, however, and accordingly it compresses the springs 53 and moves forwardly relative to the body 29. Under such conditions the flange 48 will move forwardly, exerting a force against the radially outer ends 87 of the levers 86. These levers being fulcrumed on the fingers 84 (Figure 4), the radially inner ends of the levers will exert a force to the right against the valve body 54 opposing pedal operating movement of the valve body. This creates a reaction force back to the pedal 116 and the reaction force will be proportionate to relative movement of the radially inner and outer portions of the pressure responsive unit 28 which, in turn, is proportionate to the pressure generated in the master cylinder. Thus the brake pedal is provided with accurate "feel."

It will be apparent, therefore, that the present construction provides for a "soft" initial brake pedal followed by the transmission to the brake pedal of reaction forces, as is highly desirable. If braking effort is required or desired beyond the point where the motor is energized to its maximum extent, the forward end of the valve body 54 will engage the adjacent shoulder of the body 29 and direct pedal forces will be transmitted to the plunger 11.

When the brake pedal is released, the valve return spring 58 will promptly return the valve body 54 to its normal position, the valve seat 56 picking up the valve 64 and moving it away from the seat 70 to restore the normal condition of the valve parts. The motor chamber 71 will again be connected to the constant vacuum motor chamber 72 to balance pressures on opposite sides of the pressure responsive unit 28. The counter reaction springs 53 will then move the radially outer portion of the pressure responsive unit back to its normal position, and the pressure responsive unit as a whole will be returned to its normal off position through the functioning of the conventional return spring.

The present construction is characterized by relative simplicity of the parts, and the member 77 forms a novel and efficient support for the reaction levers. The use of the cushions 76 softens the initial movement of the pedal. These cushions are slightly smaller than the sockets 75 and accordingly the cushions are capable of deformation when reaction forces become relatively heavy, in which case the radial flange portion of the member 77 seats solidly against the body 29.

The radially outer portion of the pressure responsive unit including the shell 41, the outer portion of the diaphragm 40, and the flange 48 fixed to the shell 41 are novel and efficient in operation. The flange 48 is utilized to transmit forces to the radially outer ends of the levers 86 and is also utilized to engage the reaction spring 53, the loading of which determines the point at which reaction forces are transmitted to the brake pedal by the levers 86.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A fluid pressure motor mechanism comprising a casing, a pressure responsive unit therein formed of a pair of axially relatively movable sections one of which is connected to a member to be operated, said pressure responsive unit forming with said casing a variable pressure chamber, a valve mechanism carried by said pressure responsive unit normally connecting said chamber to one source of pressure and movable to connect it to a source of different pressure to operate said pressure responsive unit, manually operable means for operating said valve mechanism, a radial reaction lever having its outer end engaging the other section of said pressure responsive unit, the inner end of said lever having mechanical connection with said manually operable member, fulcrum means engaging said lever intermediate its ends, and a resilient member carried by said one section of said pressure responsive unit and engaging said fulcrum means whereby, when said manually operable member initially moves said valve mechanism from normal position, said fulcrum means is relatively easily movable relative to said one section of said pressure responsive unit.

2. A fluid pressure motor mechanism comprising a casing, a pressure responsive unit therein formed of a pair of axially relatively movable sections one of which is connected to a member to be operated projecting axially in one direction therefrom, means biasing the other of said sections in the other direction to a normal position relative to said one section, said pressure responsive unit forming with said casing a variable pressure chamber, a valve mechanism carried by said pressure responsive unit normally connecting said chamber to one source of pressure and movable to connect it to a source of different pressure to operate said pressure responsive unit, manually operable means for operating said valve mechanism, a radial reaction lever having its outer end engaging said other section of said pressure responsive unit, the inner end of said lever having mechanical connection with said manually operable member, fulcrum means engaging said lever intermediate its ends, and a resilient member carried by said one section of said pressure responsive unit and engaging said fulcrum means whereby, when said manually operable member initially moves said valve mechanism from normal position, said fulcrum means is relatively easily movable relative to said one section of said pressure responsive unit.

3. A motor mechanism according to claim 2 wherein said one section of said pressure responsive unit is provided in a face thereof with a recess in which said resilient member is mounted, said resilient member projecting slightly beyond said face and engaging said fulcrum means, said face limiting movement of said fulcrum means relative to said one section whereby, when said fulcrum means engages said face, movement of said other section relative to said one section rocks said lever and opposes movement of said manually operable member.

4. A mechanism according to claim 2 wherein said other section of said pressure responsive unit is provided with a radially inwardly extending flange with which the outer end of said lever engages, said means for biasing said other section to a normal position relative to said one section comprising a spring arranged between said one section and said flange.

5. A mechanism according to claim 2 wherein said other section of said pressure responsive unit is provided with a radially inwardly extending flange with which the outer end of said lever engages, said means for biasing said other section to a normal position relative to said one section comprising a spring arranged between said one section and said flange, said one section of said pressure responsive unit being provided in a face thereof with a recess in which said resilient member is mounted, such member projecting slightly beyond said face and engaging said fulcrum means, said face limiting movement of said fulcrum means relative to said one section whereby, when said fulcrum means engages said face, movement of said other section relative to said one section causes said flange to rock said lever to oppose movement of said manually operable member.

6. A fluid pressure motor mechanism comprising a casing, a pressure responsive unit in said casing formed of a pair of axially relatively movable sections one of which is connected to a member to be operated, said pressure responsive unit forming with said casing a variable pressure chamber, a valve mechanism carried by said pressure responsive unit normally connecting said chamber to one source of pressure and movable to connect it to a source of different pressure to operate said pressure responsive unit, manually operable means for operating said valve mechanism, a plurality of circumferentially spaced radial reaction levers having their outer ends engaging the other section of said pressure responsive unit, the inner ends of said levers having mechanical connection with said manually operable member, a fulcrum member surrounding the axis of said pressure responsive unit and having means engaging each lever to support it for rocking movement, and a plurality of resilient members carried by said one section of said pressure responsive unit and each engaging said fulcrum member adjacent one of said levers whereby, when said manually operable member initially moves said valve mechanism from normal position, said fulcrum member is relatively easily movable relative to said one section of said pressure responsive unit.

7. A fluid pressure motor mechanism comprising a casing, a pressure responsive unit therein formed of a pair of axially relatively movable sections one of which is connected to a member to be operated projecting axially in one direction therefrom, means biasing the other of said sections in the other direction to a normal position relative to said one section, said pressure responsive unit forming with said casing a variable pressure chamber, a valve mechanism carried by said pressure responsive unit normally connecting said chamber to one source of pressure and movable to connect it to a source of different pressure to operate said pressure responsive unit, manually operable means for operating said valve mechanism, a plurality of circumferentially spaced reaction levers having their outer ends engaging said other section of said pressure responsive unit, the inner ends of said levers having mechanical connection with said manually operable member, a fulcrum member entirely surrounding the axis of said pressure responsive unit, said fulcrum member having portions engaging and supporting each lever for rocking movement intermediate its ends, said levers being arranged adjacent one face of said one section of said pressure responsive unit, resilient members recessed into said face and each engaging said fulcrum member adjacent one of said levers whereby, when said manually operable member initially moves said valve mechanism from normal position and initially moves said levers, said fulcrum member deforms said resilient members.

8. A motor mechanism according to claim 7 wherein said fulcrum member is provided with portions engaging said resilient members and slightly spaced from said face whereby, after initial movement of said manually operable member, said portions of said fulcrum member will engage solidly against said face to support said levers for turning movement to oppose movement of said manually operable member when said other section of said pressure responsive unit moves relative to said one section.

9. A mechanism according to claim 7 wherein said other section of said pressure responsive unit is provided with a radially inwardly extending flange concentric with the axis of said pressure responsive unit and with which the outer ends of said levers engage, said means for biasing said other section to a normal position relative to said one section comprising a plurality of circumferentially spaced springs arranged between said one section and said flange.

10. A fluid pressure motor mechanism comprising a casing, a pressure responsive unit therein formed of an inner body, a radially outer shell and a rolling diaphragm having its peripheral portion connected between said shell and said casing, a portion of said diaphragm being connected between said body and said shell to provide for relative axial movement between said body and said shell, a portion of said body being adapted for connection axially thereof to a member to be operated, said pressure responsive unit forming with said casing a variable pressure chamber, a valve mechanism carried by said body normally connecting said chamber to one source of pressure and movable to connect it to a source of different pressure to operate said pressure responsive unit, manually operable means for operating said valve mechanism, a plurality of radial reaction levers having mechanical connection at their radially outer ends with said shell, the inner ends of said levers having mechanical connection with said manually operable member, fulcrum means engaging and supporting said levers intermediate their ends, and a resilient member interposed between said fulcrum means and said body adjacent each lever whereby, when said manually operable member initially moves said valve mechanism from normal position, said fulcrum means is relatively easily movable relative to said one section of said pressure responsive unit, said fulcrum means having limited movement relative to said body upon operation of said levers.

11. A mechanism according to claim 10 wherein said fulcrum means comprises a single member encircling the axis of said pressure responsive unit, said body having recesses facing toward said single member, said resilient members being arranged in said recesses.

12. A mechanism according to claim 10 provided with an annular radially inwardly extending flange fixed with respect to said shell, the radially outer ends of said levers having mechanical connection with said shell by engaging said flange.

13. A mechanism according to claim 10 provided with an annular radially inwardly extending flange fixed with respect to said shell, the radially outer ends of said levers having mechanical connection with said shell by engaging said flange, and circumferentially spaced counter-reaction springs arranged between and engaging said body and said flange and biasing said shell and said diaphragm to normal positions relative to said body.

14. A mechanism according to claim 10 wherein said fulcrum means comprises a single member encircling the axis of said pressure responsive unit, said body having recesses facing toward said single member, said resilient members being arranged in said recesses, an annular flange fixed with respect to said shell and projecting radially inwardly therefrom, the radially outer ends of said levers having mechanical connection with said shell by engaging said flange, and circumferentially spaced counter-reaction springs arranged between and engaging said body and said flange and biasing said shell and said diaphragm to normal positions relative to said body.

References Cited in the file of this patent

UNITED STATES PATENTS

| 1,620,513 | Bragg et al. | Mar. 8, 1927 |
| 2,307,910 | Baade | Jan. 12, 1943 |
| 2,790,306 | Ingres | Apr. 30, 1957 |
| 2,900,962 | Ingres | Aug. 25, 1959 |